(12) United States Patent
Lin et al.

(10) Patent No.: US 11,655,972 B2
(45) Date of Patent: May 23, 2023

(54) ILLUMINATION DEVICE WITH LED STRIP LIGHT ENGINE CONFIGURED FOR RETROFITTING PIN-BASED CFL SOCKET

(71) Applicant: LEDVANCE GmbH, Garching bei Munchen (DE)

(72) Inventors: Ran Lin, Guangdong (CN); Bernhard Rieder, Regensburg (DE); Shaozhu Yang, Guangdong (CN)

(73) Assignee: LEDVANCE GMBH, Garching bei Munchen (DE)

( * ) Notice: Subject to any disclaimer, the term of this patent is extended or adjusted under 35 U.S.C. 154(b) by 197 days.

(21) Appl. No.: 16/129,174

(22) Filed: Sep. 12, 2018

(65) Prior Publication Data
US 2019/0101275 A1    Apr. 4, 2019

(30) Foreign Application Priority Data
Sep. 29, 2017    (CN) .......................... 201710909696.3

(51) Int. Cl.
| | |
|---|---|
| *F21K 9/237* | (2016.01) |
| *F21K 9/232* | (2016.01) |
| *F21K 9/235* | (2016.01) |
| *F21V 29/10* | (2015.01) |
| *F21V 29/506* | (2015.01) |
| *F21Y 115/10* | (2016.01) |
| *F21Y 103/10* | (2016.01) |
| *F21Y 107/00* | (2016.01) |
| *F21Y 107/70* | (2016.01) |

(52) U.S. Cl.
CPC .............. *F21V 29/10* (2015.01); *F21K 9/232* (2016.08); *F21K 9/235* (2016.08); *F21K 9/237* (2016.08); *F21V 29/506* (2015.01); *F21Y 2103/10* (2016.08); *F21Y 2107/00* (2016.08); *F21Y 2107/70* (2016.08); *F21Y 2115/10* (2016.08)

(58) Field of Classification Search
CPC . F21K 9/232; F21K 9/237; F21K 9/27; F21Y 2107/70; F21Y 2107/10
See application file for complete search history.

(56) References Cited

U.S. PATENT DOCUMENTS

| | | | |
|---|---|---|---|
| 2005/0207152 A1* | 9/2005 | Maxik ..................... | H05K 1/189 362/231 |
| 2008/0037245 A1* | 2/2008 | Chan ....................... | F21K 9/278 362/218 |
| 2013/0070457 A1* | 3/2013 | Nishiuchi ............... | F21V 29/83 362/235 |
| 2015/0285472 A1* | 10/2015 | Evitt ....................... | F21V 17/007 362/224 |
| 2018/0058637 A1* | 3/2018 | Thiel ....................... | F21K 9/272 |
| 2018/0224074 A1* | 8/2018 | Xiong ..................... | F21V 3/061 |
| 2019/0003659 A1* | 1/2019 | Miyajima ................ | F21K 9/27 |

* cited by examiner

Primary Examiner — Karabi Guharay
(74) Attorney, Agent, or Firm — Hayes Soloway PC

(57) ABSTRACT

An LED illumination device corresponds to a compact fluorescent lamp and has improved thermal properties. The illumination device includes a transparent tube having an inner wall defining a cavity, a light engine having one or more light emitting diodes, and a driver to drive the light engine. The light engine is disposed at the inner wall of the transparent tube. The arrangement of the light engine and the one or more light emitting diodes at the inner wall of the tube provides improved lighting characteristics. Simultaneously, an improved cooling is provided by the interface surface for conducting heat between the inner wall and the light engine.

23 Claims, 3 Drawing Sheets

ILLUMINATION DEVICE WITH LED STRIP LIGHT ENGINE CONFIGURED FOR RETROFITTING PIN-BASED CFL SOCKET

CROSS-REFERENCE

This patent application claims the benefit of and priority to Chinese Patent Application No. 2017109096963 filed on Sep. 29, 2017, the entire disclosure of which is incorporated herein by reference.

TECHNICAL FIELD

The present invention relates to an illumination device, in particular an LED illumination device that is suitable to replace a compact fluorescent lamp. The invention in particular relates to improved thermal properties of the illumination device and improving lighting performance.

BACKGROUND

Traditional fluorescent lamps such as the compact fluorescent lamp or CFL may not provide sufficient energy efficiency, are rather expensive in production and need to be carefully disposed of to ensure personal safety and reduce the risk of environmental hazards.

Accordingly, it is desirable that such CFL are replaced in the long run by lamps based on safer and more energy efficient technologies, for example by implementing light emitting diodes or LEDs. LED-based CFL at least have the advantage that less energy is consumed and the sealing and filling of the illumination device with a gas is no longer required. Accordingly, the use of LED-based CFL is generally considered desirable since it reduces energy costs and both production and disposal are considered safer and less complicated.

However, current LED-based CFL lamps produce vast amounts of heat, such that they commonly require a heat sink to conduct heat to their surroundings. Such heat sinks are frequently provided by extrusion processes and implement an extrusion aluminum profile as a heat sink. The size of such heat sinks is often considerable, such that it not only increases the weight and costs of a lamp, but also limits the dimensioning and shaping of the lamp. Furthermore, the heat sink may impair other factors such as lighting performance, which is undesirable.

Accordingly, a need exists to replace current CFLs with lamps having better thermal properties without coming at the expense of lighting performance and which are suitable for low-cost production, e.g. allow a simple and cheap production.

SUMMARY OF THE INVENTION

In view of the known prior art, it is an object of the present invention to provide a simplified light engine arrangement and an improved cooling of the light engine while providing a better lighting performance.

This object is solved by an illumination device according to the independent claim. Preferred embodiments are given by the dependent claims.

According to one aspect of the invention, the illumination device comprises a transparent tube having an inner wall defining a cavity, a light engine comprising one or more light emitting diodes, and a driver to drive the light engine, wherein the light engine is disposed at the inner wall of the transparent tube.

The arrangement of the light engine and the one or more light emitting diodes at the inner wall of the tube at least has the advantage that not only better lighting characteristics may be achieved, but simultaneously a cooling surface may be provided for the light engine for conducting heat. Accordingly, since heat from the light engine may be directly transferred to the tube, the thermal performance of the illumination device is improved, so that an additional heat sink is no longer required or at least may be reduced in size.

The light engine of the illumination device is preferably formed as a strip and is oriented along the axial direction of the transparent tube.

The axial direction of the tube is to be understood as a direction generally extending from a socket or extending in a longitudinal direction of the illumination device. This axial direction coincides with the axis of the tube when the tube is stretched out linearly.

A strip shape of the light engine at least has the advantage that the light engine may have thin dimensions in a radial direction of the tube and allows a slim and simple design. The light engine may hence be easily placed and fixed to the inner wall. In addition, such shape also has the advantage that it facilitates the production of the illumination device, e.g. by facilitating the insertion, assembly, and fixation, while at the same time it reduces the costs of said production, e.g. due to the easier production and the lower material costs.

The light engine may also comprise a plurality of separate strips, which are placed adjacent to each other, spaced apart, and/or on opposite sides of the inner wall of the transparent tube facing each other. The provision of a plurality of strips allows that a lighting performance may be selectively adjusted. In other words, the light emitted by the illumination device may either be more concentrated in one direction, e.g. when two or more strips are placed adjacent to each other, or less concentrated yet emitting more light on one side of the illumination device, e.g. when two or more strips are spaced apart on the inner wall. Furthermore, the provision of two or more strips on opposite sides of the inner wall of the transparent tube, wherein the strips are facing each other, may provide omnidirectional light, e.g. light to be emitted in all directions in a more homogeneous fashion. Depending on the intensity and homogeneity of the light to be emitted, the illumination device may comprise two or even more strips, e.g. 3, 4, 5, or more.

Preferably, the light engine is flexible. A flexible light engine at least has the advantage that it may be easily inserted during production of the illumination device. Furthermore, the flexibility allows the light engine to be adapted to a variety of surfaces, e.g. curved or bent surfaces, or even sharp or smooth corners. A flexible light engine may also be provided as a strip, wherein the thin dimensions of a strip shape together with the flexibility provide a light engine that is adaptable to the surface of the inner wall and hence allows a large range of freedom in the choice of the light bulb shape. In addition, this facilitates the production of such light bulb, by permitting both an easy insertion and by providing a more robust light engine, i.e. a light engine that is less susceptible to fractures or impairment of electrical contacts.

Furthermore, a flexibility of the light engine allows a curvature or bending of the light engine such that rather than providing a plurality of strips for different regions of the inner wall of the tube, the light engine may, for example, be elongated to provide a light engine at said regions.

Accordingly, the light engine may be formed as a single strip, wherein parts of the strip are disposed on opposing sides of the transparent tube. The opposing strip parts may hence face each other or be aligned at the inner wall around at opposing points corresponding to the diameter of the cavity. A single strip has the advantage that only one connector pad is required and may furthermore provide improved thermal cooling properties.

The strip may be fully disposed on the inner wall; however, a part of the strip not corresponding to the opposing strip parts may be placed adjacent to the inner wall of the tubing without being fixed. Such strip part may hence comprise a substantially straight, convex, or concave shape, or may also form a U-shape, inversed U-shape, or Z-shape.

Preferably, the opposing strip parts are connected by a middle part of said strip, which traverses the transparent tube at an end face of the transparent tube. Accordingly, the middle part may traverse a cross section of the tube in a substantially perpendicular direction to the axial direction of the opposing strip parts. Said middle part may be disposed at the inner wall or may be held by the ends of the opposing strip parts extending into the middle parts. Although an edge or corner may be formed between said strip parts, preferably a curvature is provided between the middle part and either opposing strip part. Such curvature may e.g. reduce the tensile force acting on the respective strip parts, yet provides sufficient structural stability to prevent a collapse of the middle strip part.

The provision of the light engine as a flexible single strip with opposing strip parts allows light to be emitted in practically all directions without any interruption or masking effects by other, e.g. mechanical fixation, cooling, or electrical components. Accordingly, said strip provides omnidirectional light.

To provide flexibility of the light engine, the light engine may comprise a flexible printed circuit board or PCB (FCB) or other components such as a CAM1, FR4, or MCPCB.

Although the middle part may be disposed at either end of the tube, it is preferred that the middle part emits light and is hence adapted to an end of the light tube. Accordingly, the middle part is preferably disposed at an end of the transparent tube opposite to the driver. This at least has the advantage that a better lighting performance may be provided while simultaneously the cooling of the light engine is improved by providing a direct heat conduction of the middle part to the inner wall, which may not be provided when disposing the middle part in proximity to the driver components.

To further facilitate the production of the illumination device and improve the cooling of the light engine, the light engine may be fixed to the inner wall of the transparent tube by a thermal adhesive, a light sensitive adhesive, a pressure sensitive adhesive, or a multi-component adhesive. For delicate materials, a thermal adhesive may be preferred. By using an adhesive, the use of screws or other mechanical attachment may be omitted and pre-drilling or further preparation steps are no longer required. Furthermore, an adhesive may be easily applied while allowing the tube to be turned and/or rotated during the production process and the curing of the adhesive, e.g. by thermal energy, occurs fast, such that the light engine may be rapidly fixed to the inner wall. In addition, the use of an adhesive provides an attachment surface that is both adapted to the inner wall and the light engine, such that heat may be efficiently conducted through said surface from the light engine to the inner wall.

The transparent tube of the illumination device may furthermore be made of a glass or plastics material, wherein the glass is transparent or coated or translucent. The use of glass or a solid or crystallized plastic may provide desirable optical characteristics. At the same time, glass may provide desirably heat conducting and cooling characteristics for the light engine disposed at the inner wall. Furthermore, a glass material may also provide sufficient heat resistance, when implementing a larger number of light emitting diodes and/or light emitting diodes with larger capacity in the light engine. Although a glass material may be preferred, a plastics material having similar material properties may also be used, e.g. when extrusion or injection molding methods are implemented for the production of the tube.

Depending on the light to be emitted, the glass or plastics material may be either fully transparent or at least in part be coated or translucent. For example, the tube may also be translucent to provide scattered or dispersed light. In addition, or alternatively, the tube may comprise a coating, e.g. for providing a variety of color schemes.

The transparent tube of the illumination device may furthermore comprise an opening at one end and an end cap closing the opening and cavity of the transparent tube, wherein the end cap is fixed to the transparent tube by an adhesive. For example, the tube may comprise an opening on only one side, wherein the end cap is mounted to the tube at said opening, such that the end cap closes the tube of the illumination device. The end cap may be sized and dimensioned to enclose the opening and the tube at said end of the tube, such that it is received by the tube and extends along an outer side of the tube at the end region.

The shape of the tube and the end cap of the illumination device may together correspond to a compact fluorescent lamp. Accordingly, the illumination device may be sized and dimensioned to be fitted in a socket of a compact fluorescent lamp housing. For example, the illumination device may comprise a mechanical connecting element at the end cap, which is received by a corresponding socket, and may comprise electrical connectors connected to the driver and extending from the end cap, which contact electrical connecting elements in said socket to provide electrical energy to the driver when the illumination device is received in a socket.

The driver may be accommodated or at least be partly housed in the transparent tube of the illumination device. Accordingly, the driver of the illumination device may be disposed in the cavity of the transparent tube, wherein the driver is orientated in a direction substantially perpendicular to the direction of the light engine. Accordingly, the driver may be at least partially fitted in the cavity of the tube in a horizontal fashion, seen from a perspective, wherein the axial direction of the transparent tube is orientated in a vertical direction. The driver may hence be situated at an end of the tube and be in a substantially planar arrangement with respect to a cross section of the end region of the tube. Since the driver is only disposed at an end of the tube, this at least has the advantage that the lighting performance is not impaired by the driver.

Alternatively, the driver may be disposed in or extend into the cavity of the transparent tube, wherein the driver is orientated in a substantially longitudinal direction of the transparent tube. In other words, the driver may be placed in parallel to the axial direction of the transparent tube. For example, a first region of the driver may be partly housed within the tube, wherein a second region extends out of the tube and is housed within e.g. an end cap of the illumination device. Accordingly, only a part of the driver may be situated within the tube, wherein the other part is not arranged in the tube. This at least has the advantage that the lighting performance is not impaired by the driver.

For electrically connecting the light engine to the driver, the driver of the illumination device may comprise at least one wire, connector, or metal spring connector disposed at an edge of the driver. For example, a wire may be used to electrically connect the light engine and the driver, however, also a conducting element may be provided, e.g. a male/female connection or providing a snap-fit connection.

Alternatively, a metal spring connector may be provided, which at least has the advantage that no further fixation components or processes are required, but instead simply is disposed between the driver and the light engine to provide an electrical connection.

The metal spring connector is preferably configured to also provide a mechanical fixation fixing the driver to the transparent tube. For example, the spring may be configured to form a press-fit arrangement, thereby fixing the driver in the tube by means of a compressive force. Alternatively, or in addition, the spring may comprise positive locking features, such that once the driver comprising the metal spring connector is inserted into the tube, the spring and driver are fixed in the tube, when the spring contacts a corresponding predefined feature in the tube, e.g. a protrusion, tab or detent. This at least has the advantage that the production is facilitated and does not require e.g. bores, screws, or other mechanical fixation elements and that the driver may be fixed simply by inserting the driver with the corresponding metal spring connector. The metal spring connector may either be formed continuously along a circumference of the driver or may comprise a plurality of metal spring connectors adapted to the number of connections required by the light engine.

The driver may furthermore be sized and dimensioned to match a shape of the tube. Accordingly, the transparent tube of the illumination device may comprise a tubular shape and the driver may comprise a circular shape, wherein the driver comprises a circumference that matches a cross sectional circumference defined by the inner wall of the transparent tube. Accordingly, the driver may be positioned adjacent to the inner wall of the tube, wherein a certain tolerance range may be provided. This at least has the advantage that the area of the printed circuit board may be optimized, to allow an optimal distribution of its components and/or to provide an optimal heat conduction of its components to the inner wall. The inner wall of the tube may furthermore comprise protrusions, such that the driver may be seated on or at a corresponding feature of the inner wall.

BRIEF DESCRIPTION OF THE DRAWINGS

Preferred embodiments of the invention will be explained in the following, having regard to the drawings. It is shown in.

DETAILED DESCRIPTION OF THE INVENTION

In the following, preferred embodiments of the invention will be described with reference to the drawings. The same or similar elements or elements having the same effect may be indicated by the same reference number in multiple drawings.

Repeating the description of such elements may be omitted in order to prevent redundant descriptions.

Figure 1A:
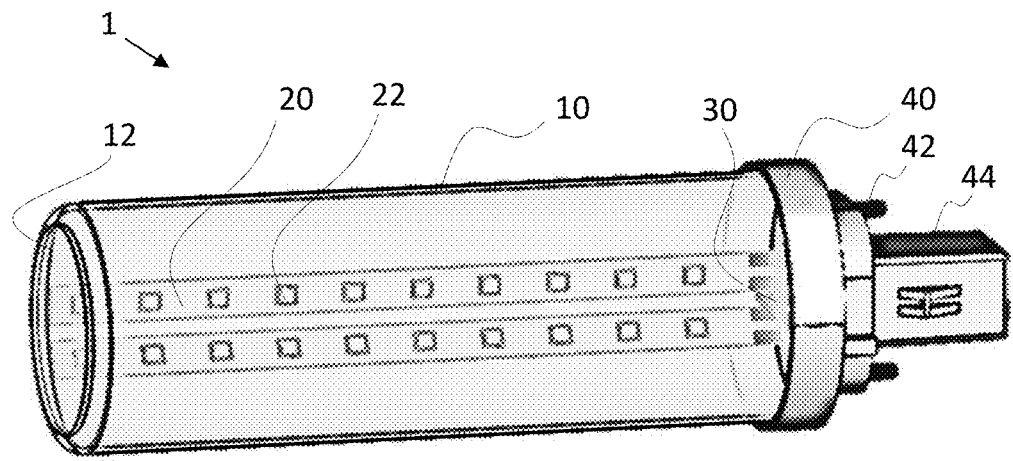
FIG. 1A a perspective view of an illumination device with a transparent tube and a light engine.

In FIG. 1A a perspective view of an illumination device 1 with a transparent tube 10 and a light engine 20 is shown. The illumination device comprises an end cap 40, which is attached to the transparent tube 10 by means of a thermal adhesive. The end cap 40 provides a connecting element 44 as well as connecting pins 42 in order to respectively provide a mechanical fixation as well as an electrical connection, when received by a corresponding socket. The transparent tube 10 comprises an inner wall 12, which defines a cavity 14 of the transparent tube 10. In the cavity 14 a light engine 20 is disposed, wherein the light engine 20 comprises a plurality of LEDs 22.

According to the embodiment the light engine 20 comprises two strips, wherein the strips are disposed at the inner wall 12 of the transparent tube 10 and are placed adjacent to each other. The strips are fixed to the inner wall 12 by means of a thermal adhesive and extend in an axial direction of the transparent tube 10, i.e. a longitudinal direction or a direction extending from the end cap 40.

The transparent tube 10 is depicted to have a tubular shape and as such may resemble the shape of a compact fluorescent lamp. In addition, the connecting element 44 as well as the connecting pins 42 may be configured to be received by a socket suitable for a compact fluorescent lamp (CFL). Accordingly, the illumination device 1 is configured to replace a CFL.

The light engine is connected to a driver 30, only shown in part. The connection between the light engine 20 and the driver is formed by an electrically conducting wire. By the same token, the connecting pins 42 are connected to the driver by means of a wire, which is soldered to the printed circuit board of the wire or is held and electrically connected by other comparable means. The driver 30 is accordingly configured to drive the light engine 20, when the connecting pins 42 are in contact with corresponding electrical elements of e.g. a socket.

Figure 1B:
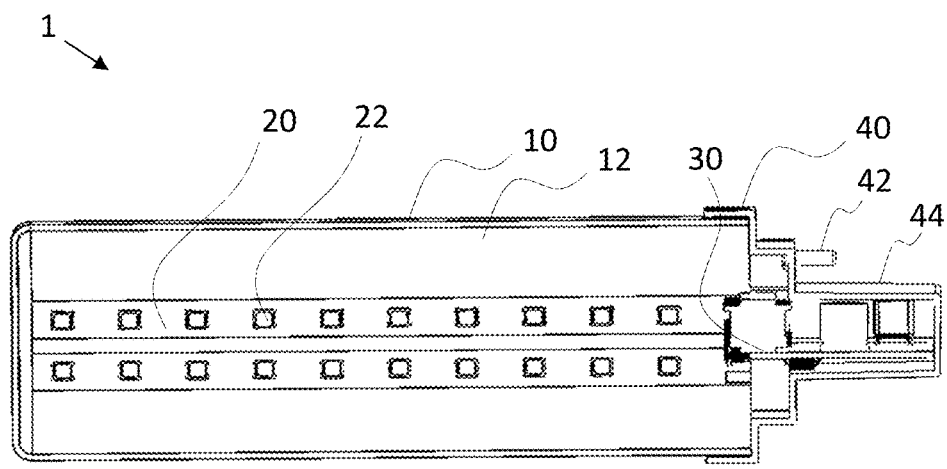
FIG. 1B a longitudinal sectional view of the illumination device as depicted in FIG. 1.

FIG. 1B shows the illumination device 1 according to FIG. 1 in a longitudinal sectional view. In addition, the driver 30 with its components is shown in more detail. The driver 30 is orientated in a direction parallel to the longitudinal direction or axial direction of the transparent tube 10. Furthermore, the majority of the driver 30 is housed within the end cap 40 and connecting element 44 of the end cap 40. As such, the space required for the driver 30 is minimized. Only a portion of the driver 30 extends into the transparent tube 10, which is the part that forms an electrical connection between the driver 30 and the light engine 20. Accordingly, the light emitted from the LEDs 22 disposed in the transparent tube 10 is not impaired by the provision of the driver 30.

Figures 2A, 2B:
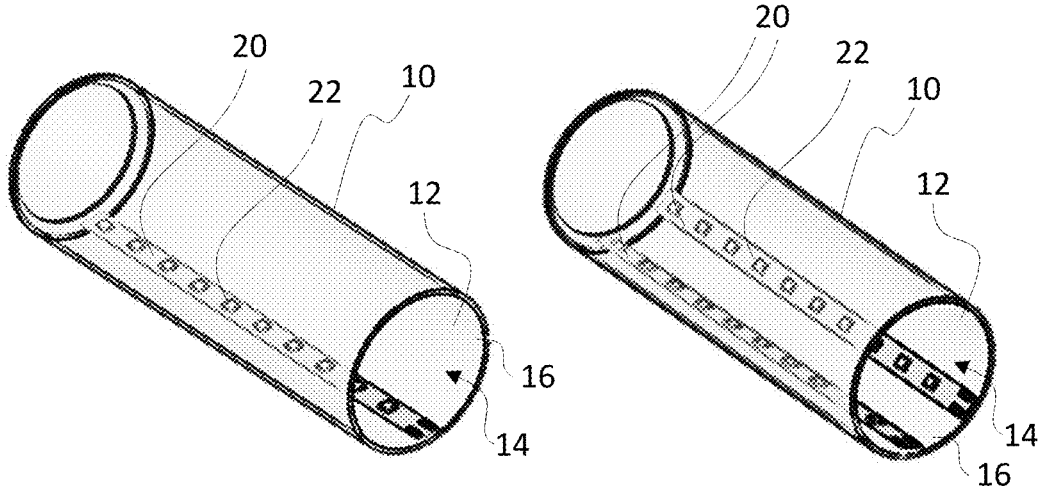
FIG. 2A a perspective view of a transparent tube with a light engine formed as a strip.
FIG. 2B a perspective view of a transparent tube with a light engine formed as two spaced apart strips.

A perspective view of a transparent tube 10 with a light engine 20 formed as a strip is shown in more detail in FIG. 2A. The inner wall 12 of the transparent tube 10 defines a cavity 14. Furthermore, the transparent tube 10 comprises an opening 16 at one end, which is e.g. configured to receive an end cap and a driver. The strip is disposed at the inner wall 12 in a longitudinal or axial direction of the transparent tube, similar to the embodiment shown in FIGS. 1A and 1B. The LEDs 22 preferably comprise a continuous spacing between each other to cause homogenous light to be emitted, however, other arrangements may be provided.

A corresponding embodiment comprising two strips is shown in FIG. 2B. The light engine 20 comprising the LEDs may hence be considered as a single light engine 20 comprised of two strips or as two light engines 20, each formed as a strip. The strips are shown to extend throughout the entire cavity 14, starting from the opening 16 towards the other end of the transparent tube 10. However, the strip may also have shorter dimensions, such that it does not extend to the other end of the transparent tube 10. Accordingly, the strips are also disposed at the inner wall 12 of the transparent tube 10. According to the embodiment of FIG. 2B the strips are placed spaced apart. Although the strips are depicted to be spaced apart by one fifth of a turn, the spacing between the strips may also be smaller or larger, depending on the required focus and radius of the emitted light.

Figures 2C, 2D:
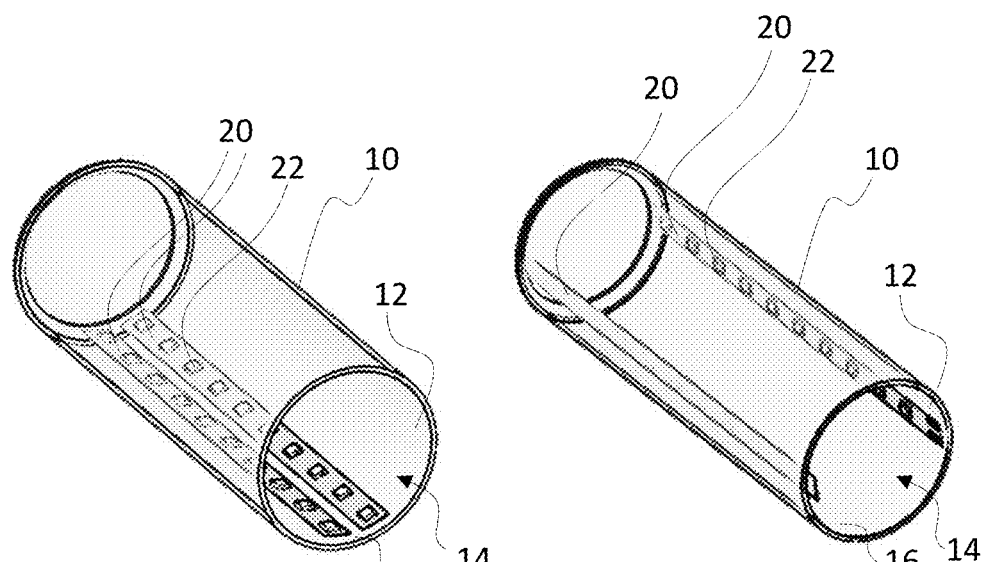
FIG. 2C a perspective view of a transparent tube with a light engine formed as two adjacently placed strips.
FIG. 2D a perspective view of a transparent tube with a light engine formed as two strips opposing each other.

For example, as shown in FIG. 2C, the strips or light engines 20 may be placed adjacently to each other at the inner wall 12 of the transparent tube 10 to e.g. provide light in a specific direction. Although light from the LEDs 22 will be emitted in all directions, the light will generally be concentrated in the area wherein the strips are disposed. Such a strip arrangement may e.g. be suitable for reading lamps or lamps having a predefined aperture or light emitting range. The cavity 16 may furthermore be dimensioned on the heat produced by the light engine 20. Accordingly, a smaller cavity 14 may be provided for low light requirements, whereas the cavity may be larger, when high lighting performance is required or when the heat produced by the adjacent light engines 20 requires a large conducting or cooling surface.

Alternatively, the strips or light engines 20 may be placed further apart from each other, as shown in FIG. 2D. Accordingly, the strips are arranged substantially on opposing sides of the transparent tube 10 at the inner wall 12. Accordingly, the strips may provide omnidirectional light. Although only two strips are shown, the transparent tube 10 may be configured to comprise more than two strips, for fine tuning of the lighting or providing more or stronger omnidirectional light.

Figure 3:
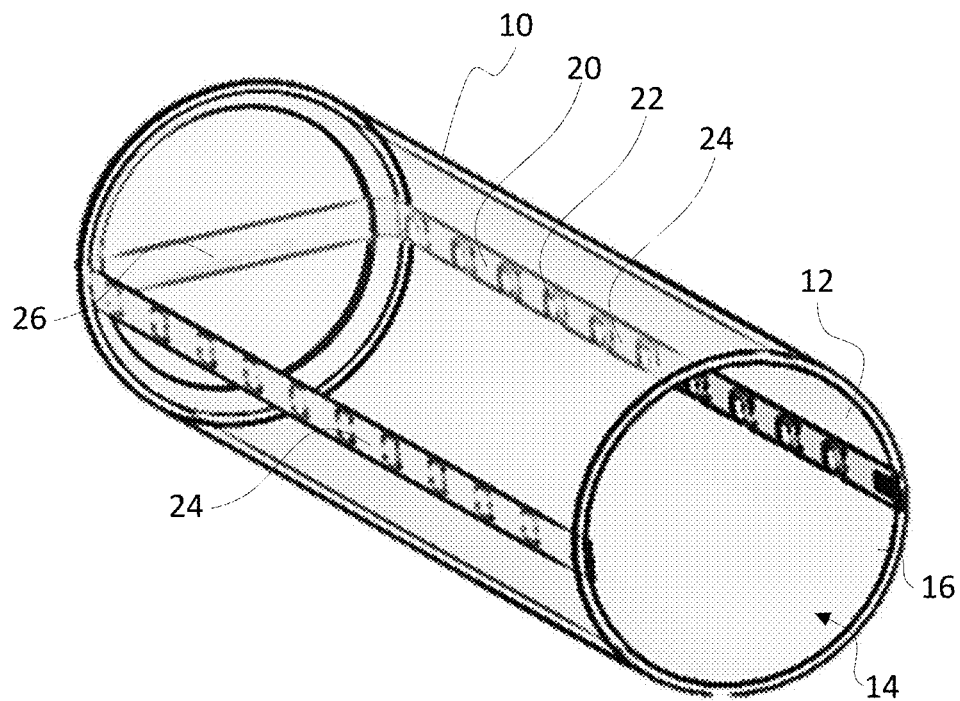
FIG. 3 a perspective view of a transparent tube with a light engine formed as a single flexible strip.

FIG. 3 shows a perspective view of an alternative embodiment of a light engine 20 formed as a single strip. As depicted in the other Figures the light engine 20 comprises a plurality of LEDs 22. According to this embodiment, the light engine 20 is flexible, e.g. by provision of a flexible PCB.

Accordingly, the light engine 20 is provided as an elongate strip, wherein one part of the strip is provided on the inner wall 12 on one side of the transparent tube 10 and another part of the strip is disposed on the inner wall on an opposing side of the transparent tube 10, thereby forming two opposing strip parts 24. The opposing strip parts 24 are connected by a middle part 26, which traverses the cavity 14 at an end of the transparent tube 10 that is opposite to the opening 16 and/or driver. The middle part 24 may be disposed on the inner wall 12 at said end or may simply be held by the opposing strip parts 24. The middle part may furthermore comprise LEDs to emit light from the end part of the transparent tube 10 in an axial direction. Alternatively, the middle part 26 may merely form an electrical and/or mechanical connecting part between the opposing strip parts 24.

Figures 4A, 4B:
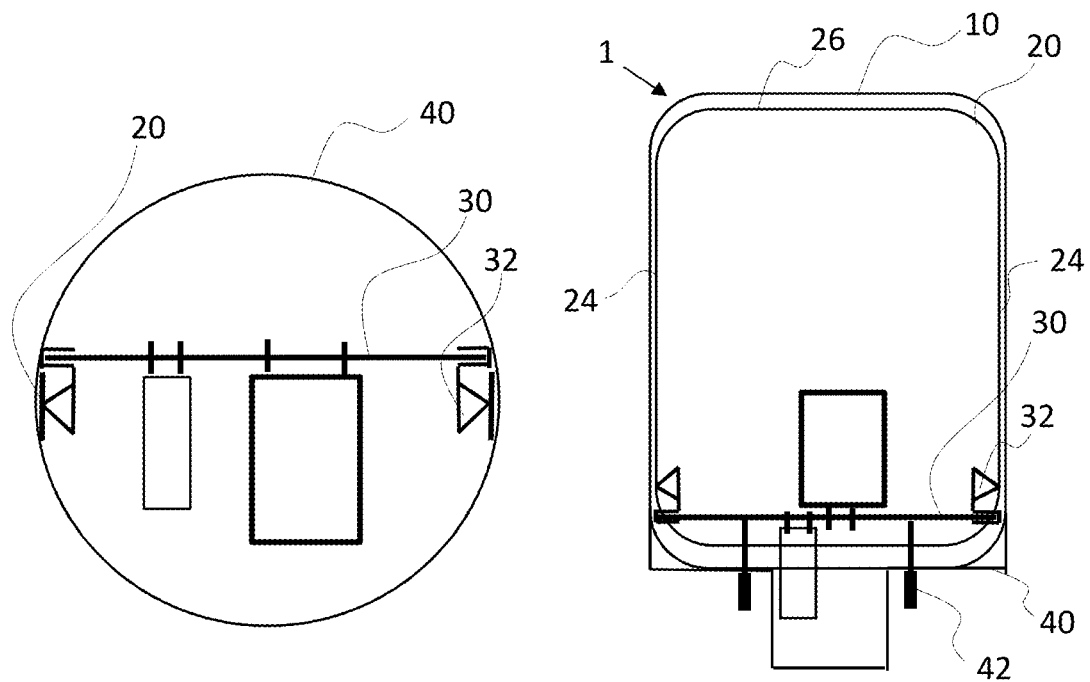
FIG. 4A a cross-sectional view of an end cap at an opening of the tube comprising a driver with connectors.
FIG. 4B a longitudinal sectional view of an illumination device with an end cap at an opening of the tube and comprising a driver with connectors.

In FIG. 4A a cross-sectional view of an end cap 40 is shown at an opening of the transparent tube comprising a driver 30 with connectors. The driver 30 is shown to comprise several electrical components on its PCB. The driver 30 is furthermore shown to be placed in a direction that is parallel to axial direction of the tube. Accordingly, the driver 30 is hence considered in a vertical position, when considering the corresponding illumination device in an upright position. The driver 30 is electrically connected with the light engines 20 by means of two metal spring connectors 32. Accordingly, said metal spring connectors 32 are arranged at the edges of the driver 30 or PCB of said driver 30 and engage the light engines 20 to form an electrical connection. In addition, the metal spring connectors may be configured and dimensioned to provide a mechanical stability of the driver 30 or even hold or fix the driver 30 within the end cap 40 and transparent tube.

An alternative orientation of the driver 30 is shown in FIG. 4B. The illumination device 1 is shown in a longitudinal sectional view with an end cap 40 at an opening of the transparent tube 10 and comprising a driver 30 with metal spring connectors 32. The metal spring connectors 32 provide an electrical connection between the driver 30 and the light engine 20. The light engine 20 is depicted as a single flexible strip comprising two opposing strip parts 24 disposed at the inner wall 12 and a middle part 26 at an end of the transparent tube 10 opposite to the driver 30. The middle part 26 traverses the cavity of the transparent tube 10 and is placed adjacently to the inner wall 12 of the end of the transparent tube 10 opposing the driver 30. The driver 30 is connected to the connecting pins 42 and forms an electrical connection between said connecting pins 42 and the light engine 20 by means of the metal spring connectors 32. Preferably, said metal spring connectors 32 also provide a mechanical stability or support for the driver 30 in the transparent tube 10.

The driver 30 is placed in the transparent tube 10 in a substantially horizontal plane, wherein the illumination device 1 is considered in an upright and vertical position. Accordingly, the driver 30 is orientated in a direction perpendicular to the axial direction of the transparent tube 10 and the axial direction of the light engine 20. In addition, the driver 30 is dimensioned to match the tubular shape of the transparent tube 10 by having a substantially circular shape and a circumference that matches the cross sectional circumference defined by the inner wall of the transparent tube 10. This at least has the advantage that the driver is fully seated and housed within the transparent tube 10, thereby minimizing the amount of electrical components in the end cap 40, which may facilitate production of the illumination device 1 and furthermore makes electrical components, otherwise housed within the end cap 40 of the illumination device 1, less susceptible for damage.

Although the invention has been illustrated and described in detail by the embodiments explained above, it is not limited to these embodiments. Other variations may be derived by the skilled person without leaving the scope of the attached claims.

Generally, "a" or "an" may be understood as singular or plural, in particular with the meaning "at least one", "one or more", etc., unless this is explicitly excluded, for example by the term "exactly one", etc.

In addition, numerical values may include the exact value as well as a usual tolerance interval, unless this is explicitly excluded.

Features shown in the embodiments, in particular in different embodiments, may be combined or substituted without leaving the scope of the invention.

LIST OF REFERENCE NUMERALS

1 Illumination device
10 Transparent tube
12 Inner wall
14 Cavity
16 Opening
20 Light engine
22 Light emitting diode or LED
24 Opposing strip part
26 Middle part
30 Driver
32 Metal spring connector
40 End cap
42 Connecting pin
44 Connecting element

The invention claimed is:

1. An illumination device comprising:
a light-transmissive tube having an inner wall defining a cavity;
a light engine comprising:
at least one physically flexible circuit board formed as a strip and extending substantially linearly in a longitudinal axial direction of the light-transmissive tube; and
one or more light emitting diodes populated on the at least one physically flexible circuit board; and
a driver configured to drive the light engine;
wherein the at least one physically flexible circuit board of the light engine is fixed directly on the inner wall of the light-transmissive tube by a first adhesive; and
wherein the illumination device is configured to be received within a socket to provide electrical energy to the driver.

2. The illumination device according to claim 1, wherein the at least one physically flexible circuit board is formed as a plurality of separate strips placed adjacent to each other and extending substantially linearly in the longitudinal axial direction of the light-transmissive tube.

3. The illumination device according to claim 1, wherein the at least one physically flexible circuit board is formed as a plurality of separate strips placed so as to face each other on opposite sides of the inner wall of the light-transmissive tube and extending substantially linearly in the longitudinal axial direction of the light-transmissive tube.

4. The illumination device according to claim 1, wherein the at least one physically flexible circuit board is formed as a single continuous strip comprising:
a first strip part;
a second strip part disposed opposite the first strip part, across a transverse width of the light-transmissive tube; and
a third strip part which connects the first strip part and the second strip part and which traverses the transverse width of the light-transmissive tube at an end of the light-transmissive tube, substantially perpendicular to the longitudinal axial direction of the light-transmissive tube.

5. The illumination device according to claim 4, wherein the third strip part is disposed at the end of the light-transmissive tube which is opposite to the driver.

6. The illumination device according to claim 1, wherein the first adhesive comprises at least one of a thermal adhesive, a light sensitive adhesive, a pressure sensitive adhesive, and a multi-component adhesive.

7. The illumination device according to claim 1, wherein:
the light-transmissive tube comprises an opening at one end; and
the illumination device further comprises an end cap closing the opening and the cavity of the light-transmissive tube, said end cap being fixed to the light-transmissive tube by a second adhesive.

8. The illumination device according to claim 7, wherein the light engine is arranged in a generally U-shaped configuration that extends from near the end cap along a first length of the inner wall, along an end face of the light-transmissive tube distal to the end cap, and returns along a second length of the inner wall to near the end cap.

9. The illumination device according to claim 1, wherein the driver is disposed in the cavity of the light-transmissive tube and is oriented in a direction substantially perpendicular to the direction of the light engine.

10. The illumination device according to claim 1, wherein the driver is disposed in or extends into the cavity of the light-transmissive tube and is oriented in a substantially longitudinal direction of the light-transmissive tube.

11. The illumination device according to claim 1, wherein the driver is electrically connected to the light engine by at least one wire, connector, or metal spring connector disposed at an edge of the driver.

12. The illumination device according to claim 11, wherein the metal spring connector is configured to provide a mechanical fixation fixing the driver to the light-transmissive tube.

13. The illumination device according to claim 12, wherein the light-transmissive tube has a physical feature configured to engage the metal spring connector so as to fix the metal spring connector in the light-transmissive tube, wherein the physical feature is configured as either a protrusion, a tab, or a detent.

14. The illumination device according to claim 1, wherein the driver is of a circular shape, having an outer circumference that substantially matches a cross-sectional inner circumference defined by the inner wall of the light-transmissive tube.

15. The illumination device according to claim 1, wherein:
the driver comprises a circuit board having one or more electrical components populated thereon; and
a majority, but less than an entirety, of the driver is situated outside of the cavity defined by the light-transmissive tube.

16. The illumination device according to claim 1, wherein:
the driver comprises a circuit board having one or more electrical components populated thereon; and
at least one surface of the circuit board, which faces an end face of the light-transmissive tube distal to the circuit board, is entirely situated inside of the cavity defined by the light-transmissive tube.

17. The illumination device according to claim 1, wherein:
the driver comprises a circuit board having one or more electrical components populated thereon; and the circuit board is entirely situated inside of the cavity defined by the light-transmissive tube.

18. The illumination device according to claim 1, wherein the driver is electrically connected with the light engine by at least two metal spring connectors which are arranged at edges of the driver and which engage the light engine in a manner that fixes the driver relative to the light-transmissive tube.

19. The illumination device according to claim 1, wherein the socket is a pin-based compact fluorescent lamp (CFL) socket.

20. The illumination device according to claim 1, wherein the light engine is wholly linear in shape.

21. The illumination device according to claim 1, wherein the at least one physically flexible circuit board extends substantially linearly without any twisting or winding.

22. The illumination device according to claim 1, wherein the at least one physically flexible circuit board extends substantially linearly parallel to the longitudinal axial direction of the light-transmissive tube.

23. The illumination device according to claim 1, wherein the at least one physically flexible circuit board extends substantially linearly from one perimetral position within the light-transmissive tube.

* * * * *